United States Patent Office 2,850,755
Patented Sept. 9, 1958

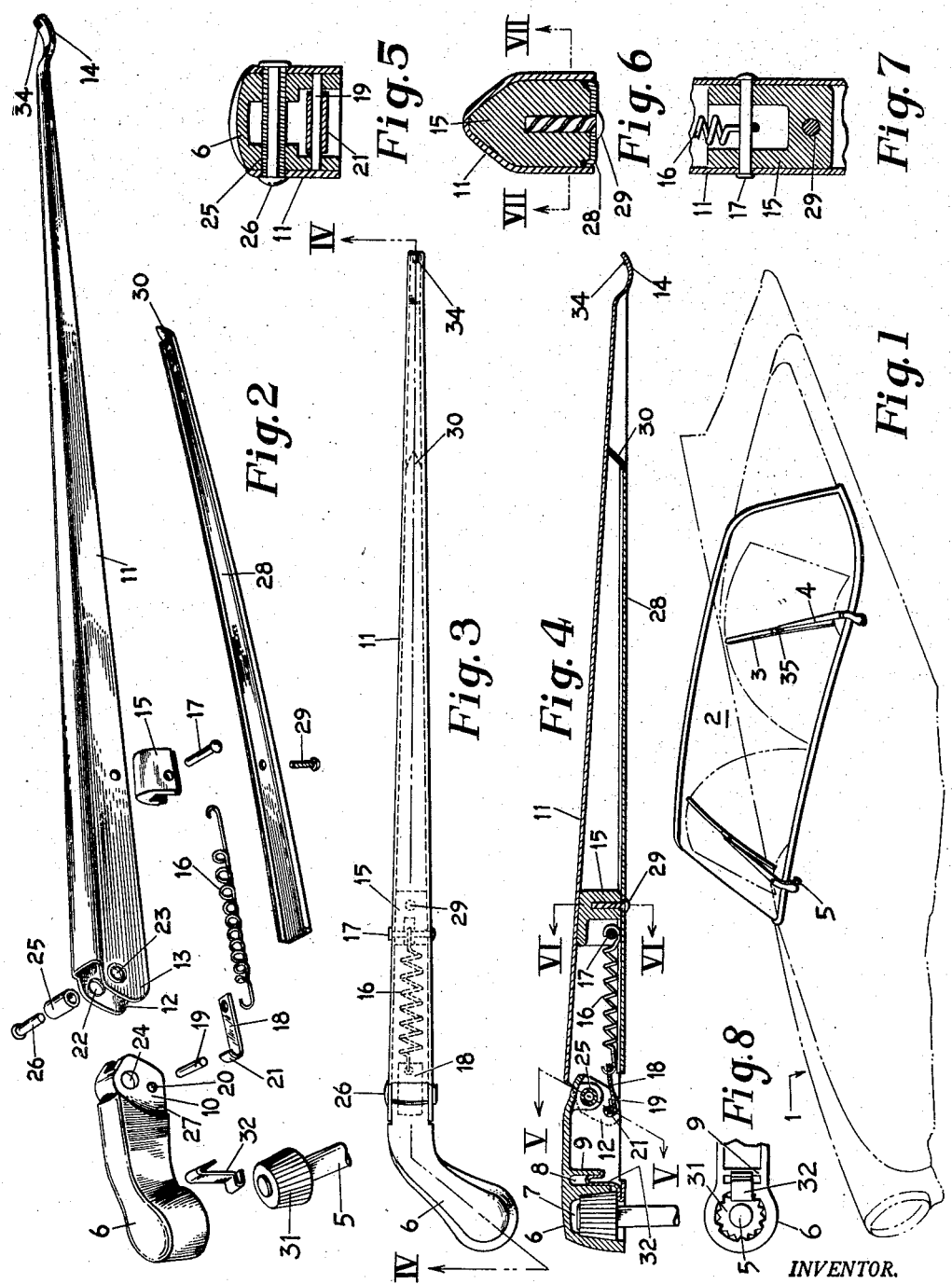

2,850,755

WINDSHIELD WIPER ARM

Raymond A. Deibel, Cheektowaga, N. Y., assignor to Trico Products Corporation, Buffalo, N. Y.

Application February 12, 1954, Serial No. 409,847

10 Claims. (Cl. 15—255)

This invention relates to a windshield wiper for automotive vehicles, and more particularly to the arm employed with said wiper.

Heretofore wiper arms comprised an elongated section of flat stock having a head at one end by which it was attached to the rockshaft, and a clip for connection to the squeegee at the opposite end. A spring located interiorly of the head was employed to bias the arm toward the windshield.

With the advent of super highways and high horsepower engines, automotive vehicles are being operated at speeds which were never before possible without endangering the occupants of the vehicle. Because of these increased speeds, the higher relative wind velocity tends to lift the wiper clear of the shield. In order to counteract the phenomenon, heavier springs have been employed in an attempt to maintain contact between the shield and squeegee regardless of the relative wind velocity. However, this solution to the problem has not proved to be entirely satisfactory since too heavy a spring will result in excessive contact pressure between the squeegee and windshield, diminishing the efficiency of the wiping action. Further, the flat stock which comprises the major portion of the arm tends to flex away from the shield when the relative wind velocity surpasses a predetermined magnitude. This condition arises even when the heaviest spring permissible is employed to bias the wiper toward the shield. Constructing the arm of heavier stock in order to diminish its flexibility is undesirable as this would excessively increase its inertia. It has, however, been found that by employing a substantially channel shaped cross-section, the arm may be made sufficiently rigid so as to withstand the flexure caused by commonly encountered wind velocities without concurrently increasing the inertia of said arm to an objectionable extent.

Accordingly, it is the primary object of this invention to provide a wiper arm which will not flex excessively when subjected to high wind velocities, and is concurrently sufficiently light in weight so as to not to have excessively high inertia.

For a better understanding of this and other objects of the invention, reference is made to the following specification and accompanying drawings wherein:

Fig. 1 is a diagrammatic view of an automotive vehicle equipped with windshield wiper arms constructed in accordance with the present invention;

Fig. 2 is an exploded view of the arm;

Fig. 3 is a top view of the arm,

Fig. 4 is a sectional view of the arm taken on line IV—IV of Fig. 3 and looking in the direction of the arrows;

Fig. 5 is a view taken on line V—V of Fig. 4 in the direction of the arrows;

Fig. 6 is a sectional view of the filler block taken on line VI—VI of Fig. 4;

Fig. 7 is a view taken on line VII—VII of Fig. 6; and,

Fig. 8 is a bottom plan view of a portion of the arm illustrating the manner in which the head and driver are operatively engaged.

Referring now more particularly to the drawing, the numeral 1 generally designates an automotive vehicle having a windshield 2 and squeegees 3. Arms 4 join the squeegees to rockshafts 5 which are connected to the wiper motor, not shown, in the conventional manner.

The head 6 is substantially channel shaped having a tapered blind bore 7 at one end. Slot 8 is created by the provision of a transverse shoulder 9 inboard of the bore. The opposite end of the head is undercut at 10 in order to provide a socket for the arm 11.

The arm 11 is of an elongated tapered channel shape having ears 12 and 13 at one end and a terminal in the form of an arcuate saddle 14 at its opposite end. As is best seen in Fig. 4, the tapering sides of the channel merge with the saddle so as to add rigidity thereto. This is necessary in order to prevent the saddle from being sheared off the arm by the stresses resulting from wind lift. Inturned lug 34 is provided on the saddle for the purpose of engaging clip 35 of the squeegee. A brace in the form of a partially hollow filler block 15 serving the dual purpose of adding rigidity to the assembly and serving as an anchor for spring 16 is fastened to the arm by rivet 17. The opposite end of the spring is anchored to plate 18, the hook 21 of which is wrapped around pin 19, the pin having previously been inserted in holes 20 provided therefor in the head.

Ears 12 and 13 of arm 11 are telescoped over the undercut portion of the head so as to line up holes 22 and 23 with mating holes 24. Bushing 25 and rivet 26 are then passed through the holes so as to pivotally connect the head and arm. As the arm pivot is located above and outboard of pin 19, spring 16 exerts a moment on the arm which causes it to rotate in a clockwise direction with respect to the head 6, the degree of rotation being limited by the engagement of ears 12 and 13 with shoulders 27 formed by undercut 10. Additionally it should be noted that the overall moment to which the arm is subjected due to the spring pressure remains substantially constant regardless of the relative positions of the head and arm at any given time. When the arm moves clockwise with respect to the head, the tension in the spring decreases while the angle between the lever arm and spring axis increases so as to increase the effective lever arm. The converse is the case when the arm moves counterclockwise relative to the head. As a result, the product of the spring created force multiplied by the effective lever arm tends to maintain a constant value. Cover plate 28 which is sprung inwardly is attached to filler block 15 by drive screw 29, with inturned lug 30 being forced into firm engagement with the underside of the arm due to the natural resiliency of the plate.

Rockshaft 5 having a serrated driver 31 is inserted in bore 7 with the serrations on the driver engaging mating serrations in the bore as is best seen in Fig. 8. It has been found that the oscillations of the rockshaft may be efficiently transmitted to the arm when only one third of the serrations of the driver are engaged by the head. For this reason, and in order to facilitate assembly, the head is fabricated with only one third as many serrations as those existent on the driver. Retainer clip 32 is then inserted in slot 8, its natural resiliency holding it firmly in place. The hooked portion of the clip engages the underside of the driver preventing its inadvertent withdrawal from bore 7.

It may therefore be seen that by constructing the arm of channel shaped elements, a high degree of rigidity may be attained with only a negligible increase in weight. Wiper arms of the above configuration will not flex or bow when subjected to the wind lift resulting from operating automotive vehicles at high speed.

Having thus disclosed an exemplary embodiment thereof, what I claim as my invention is:

1. A wiper arm for an automotive vehicle having a windshield and a rockshaft comprising, a substantially hollow head having an inboard end and an outboard end, the inboard end of said head being adapted to be operatively mounted on the rockshaft, an arm of tapered channel shaped cross-section pivotally connected to the head, spring means for urging the arm toward the windshield, and a brace substantially complementing the cross-sectional shape of said arm located interiorly of said arm intermediate the opposite ends thereof, said brace acting as an anchor for one end of the spring means, the opposite end of said spring means being attached to the head at a point inboard and below said pivotal connection for the arm so that an upward movement of the arm with respect to the head will not materially increase the tension of the spring in the effective leverage of its attachment to the head.

2. A wiper for an automotive vehicle having a windshield and a rockshaft comprising, a substantially hollow head adapted to be operatively mounted on the rockshaft, an arm of tapered channel shaped cross-section pivotally connected to said head, spring means urging said arm toward the windshield, a filler member located interiorly of said arm and substantially conforming to the cross-section shape thereof for lending rigidity thereto, and a terminal formed integrally with said arm for attachment to a squeegee the side walls of said channel-shaped arm merging into said terminal to reinforce the juncture between said arm and said terminal.

3. A wiper for an automotive vehicle having a windshield and a rockshaft comprising, a substantially hollow head adapted to be operatively mounted on the rockshaft, an arm of tapered channel shaped cross-section pivotally connected to said head, and spring means for urging said arm toward the windshield, said arm being formed to provide a terminal integral therewith for attachment to a squeegee, the side walls of said arm merging into said terminal to reinforce the juncture therebetween.

4. A wiper for an automotive vehicle having a windshield and a rockshaft comprising, a substantially hollow head having an inboard end and an outboard end, the inboard end of said head being adapted to be operatively mounted on the rockshaft, an arm of tapered channel shaped cross-section pivotally connected to said head, spring means for urging said arm toward the windshield, a filler member substantially complementing the cross-sectional shape of said arm located interiorly of said arm intermediate the opposite ends thereof for lending rigidity to said arm, and for acting as an anchor for one end of the spring means, the opposite end of said spring means being attached to the head at a point inboard and below said pivotal connection for the arm so that an upward movement of the arm with respect to the head will simultaneously produce an increase in the tension of the spring and a compensating reduction in the effective leverage of the spring attachment to the head, said arm being formed to provide a terminal integral therewith for attachment to a squeegee.

5. A wiper for an automotive vehicle having a rockshaft comprising, a head adapted to be operatively mounted on the rockshaft, an arm of tapered channel shaped cross-section pivotally connected to said head, a filler member substantially complementing the cross-sectional shape of said arm positioned therein for the purpose of lending rigidity to said arm, and an elongated resilient cover plate covering said filler member, the outboard portion of said cover plate being sprung inwardly to resiliently abut said tapered arm and so be held firmly in place.

6. A wiper for an automotive vehicle having a windshield and a rockshaft comprising, a head adapted to be operatively mounted on the rockshaft, an arm of substantially channel shaped cross-section pivotally connected to said head, an elongated cover plate for said arm, said cover plate having edges extending inwardly into said arm, anchor means for interlocking the cover plate and arm, a part of said anchor means extending transversely of the sides of the arm, said anchor means being located intermediate the opposite ends of the cover plate, and having a bearing portion receiving the surface of said plate, and resilient means having one of its ends connected to said anchor means and its opposite end connected to said head so as to bias said arm toward the windshield.

7. A wiper for an automotive vehicle having a rockshaft comprising, a head adapted to be operatively mounted on the rockshaft, an arm of tapering channel shaped cross-section pivotally connected to said head, a squeegee attaching part on the outboard end of said arm, the sides of said channel shaped arm merging with said squeegee attaching part so as to lend rigidity thereto, a filler brace located interiorly of said arm and for generally conforming to the cross-sectional shape thereof lending rigidity to said arm, and an elongated resilient cover plate mounted on said arm, the outboard portion of said cover plate being formed inwardly to abut the arm channel inner surfaces.

8. A wiper for an automotive vehicle having a windshield and a rockshaft comprising, a head adapted to be operatively mounted on the rockshaft, an arm of tapering substantially channel shaped cross-section pivotally connected to said head and having a squeegee attaching part on the outboard end of said arm, the sides of said channel shaped arm merging with said squeegee attaching part so as to lend rigidity thereto, an elongated cover plate for said arm, said cover plate extending along said arm, anchor means including connecting means for interlocking the cover plate and arm, a part of said anchor means extending transversely of the sides of the arm, said anchor means being located intermediate the opposite ends of the cover plate and having a bearing portion beneath said plate, attachment means in the arm and cover plate, and resilient means having one of its ends connected to the anchoring means and its opposite end connected to the head so as to bias the arm toward the windshield.

9. A wiper arm for an automotive vehicle having a rockshaft comprising, a head adapted to be operatively mounted on the rockshaft, an arm of tapering channel shaped cross-section pivotally connected to the head, a squeegee attaching part on the outboard end of said arm, an elongated cover plate for said arm, said cover plate having contacting edges positioned inwardly of said arm, and anchor means for interlocking said cover plate and arm, a part of said anchor means extending transversely of the sides of the arm, said anchor means being located intermediate the opposite ends of the cover plate and having a bearing portion beneath the surface of said plate.

10. A wiper arm for an automotive vehicle having a rockshaft comprising, a head adapted to be operatively mounted on the rockshaft, an arm of substantially channel shaped cross-section pivotally connected to said head, an elongated cover plate for said arm, said cover plate having contacting edges extending inwardly into said arm, anchor means including connecting means for interlocking said cover plate and arm, a part of said anchor means extending transversely of the sides of said arm to impart rigidity to the arm, said anchor means being located intermediate the opposite ends of said cover plate and having a bearing portion beneath the surface of said plate.

(References on following page)

References Cited in the file of this patent

UNITED STATES PATENTS

| | | |
|---|---|---|
| 1,916,544 | Whitted | July 4, 1933 |
| 1,952,866 | Hueber | Mar. 27, 1934 |
| 2,286,035 | Horton | June 9, 1942 |
| 2,365,751 | Curtiss | Dec. 19, 1944 |
| 2,443,976 | Baldwin | June 22, 1948 |
| 2,715,238 | Krohm | Aug. 16, 1955 |

FOREIGN PATENTS

| | | |
|---|---|---|
| 641,526 | Great Britain | Aug. 16, 1950 |